United States Patent
Goodings

(10) Patent No.: US 7,266,141 B2
(45) Date of Patent: Sep. 4, 2007

(54) HYBRID FRAME STRUCTURE FOR WIRELESS COMMUNICATIONS

(75) Inventor: Chris J. Goodings, Hampshire (GB)

(73) Assignee: VTech Communications, Ltd, Hong Kong (HK)

( * ) Notice: Subject to any disclaimer, the term of this patent is extended or adjusted under 35 U.S.C. 154(b) by 777 days.

(21) Appl. No.: 10/199,424

(22) Filed: Jul. 19, 2002

(65) Prior Publication Data

US 2004/0013166 A1 Jan. 22, 2004

(51) Int. Cl.
H04B 1/713 (2006.01)
(52) U.S. Cl. .................. 375/132; 375/267; 370/337
(58) Field of Classification Search ............ 375/130, 375/131, 132, 138, 144, 147, 219, 220, 267; 455/324; 370/337
See application file for complete search history.

(56) References Cited

U.S. PATENT DOCUMENTS

| | | | | |
|---|---|---|---|---|
| 5,044,010 A * | 8/1991 | Frenkiel et al. | ............ | 455/464 |
| 5,471,071 A * | 11/1995 | Yoshihara | ............ | 257/69 |
| 5,848,095 A * | 12/1998 | Deutsch | ............ | 375/133 |
| 5,917,812 A * | 6/1999 | Antonio et al. | ............ | 370/337 |
| 5,918,169 A * | 6/1999 | Dent | ............ | 455/324 |
| 6,229,796 B1 * | 5/2001 | Dent | ............ | 370/335 |
| 6,434,183 B1 * | 8/2002 | Kockmann et al. | ............ | 375/132 |
| 6,532,223 B1 * | 3/2003 | Sakoda et al. | ............ | 370/337 |
| 6,587,498 B1 * | 7/2003 | Sarkola | ............ | 375/132 |
| 6,671,309 B1 * | 12/2003 | Craig et al. | ............ | 375/132 |
| 2002/0126692 A1 * | 9/2002 | Haartsen | ............ | 370/450 |

* cited by examiner

*Primary Examiner*—Kevin Burd
*Assistant Examiner*—Freshteh N Aghdam
(74) *Attorney, Agent, or Firm*—Paul, Hastings, Janofsky & Walker LLP

(57) ABSTRACT

A hybrid data frame is presented for a time division multiple access frequency hopping communications system. The frame includes uplink and downlink subframes, and each subframe includes a plurality of frequency hops. First frequency hops in each subframe have at least one time slot, and the first hops follow default non-adaptive frequency hopping patterns, such that unsynchronized communicating units can synchronize with the communications system during the first hops using the predetermined default pattern. The second frequency hop also includes at least one time slot, and employs an adaptive frequency hopping pattern. Once a communicating unit is synchronized to the communications system via the first frequency hop, it can be assigned to a time slot within the second hop and adaptive frequency hopping interference avoidance techniques can be implemented.

7 Claims, 9 Drawing Sheets

HYBRID FRAME STRUCTURE FOR WIRELESS COMMUNICATIONS

BACKGROUND OF THE INVENTION

1. Field of the Invention

This invention relates in general to wireless digital communications. In particular, the invention relates to an improved frame structure for use in time division multiple access frequency hopping radio communications.

2. Background Art

Devices incorporating wireless communication techniques are becoming increasingly prevalent in modern society. An inevitable result of this trend is that the frequency spectrums over which these communications take place are becoming more crowded and prone to interference. At the same time, consumers are also greatly concerned about issues of privacy and security of communications. Consequently, system engineers designing a variety of wireless communications systems, including cellular and cordless telephones, often turn to digital spread spectrum signaling methods to achieve better voice quality, greater security, and more efficient bandwidth utilization than can be achieved with other signaling methods, such as conventional amplitude or frequency modulation.

One popular spread spectrum signaling technique is frequency-hopping spread spectrum ("FHSS") technology. A FHSS transceiver operates by rapidly changing the frequency at which it receives and transmits signals in a known pattern, called the hop sequence or hop pattern. By using their own unique hop sequences, multiple systems can communicate simultaneously over a common frequency bandwidth. FHSS offers better voice quality and improved reliability compared to other solutions in noisy environments because only a short segment of data is transmitted on any given frequency channel. Therefore, if a channel is noisy or otherwise prone to interference, that data segment can simply be discarded. When the number of bad channels in the hop sequence is relatively low, the resulting degradation in data throughput is relatively minor.

In many FHSS applications, such as cordless telephony, a two-way communications link is required. One technique for implementing such a two-way communications link is called Time Division Duplexing ("TDD"). In a TDD system, each of two communications devices joined by a communications link can both transmit and receive data in each frame. A typical TDD FHSS data frame structure, as might be implemented by a cordless telephone base station communicating with a single cordless telephone handset, is illustrated in FIG. 1. Each frame 100 occupies one frequency hop in the hop sequence with the successive frame operating at the next frequency in the hop sequence. The frame begins with guard band 110. The guard band provides a time period during which the base station transmitter can couple to the base station antennae and the transmitter's phase locked loop (PLL) can settle on the required carrier frequency for transmission. Subsequent to guard band 110, the base station transmitter transmits any desired data signals during time slot 120. Another guard band 130 is provided to allow the base station receiver tuning PLL to settle on the frequency required for reception as the base station sets up to receive data, and then the base station receiver monitors the channel during time slot 140. Finally, guard band 150 provides a time period during which any required switching occurs, and the transceiver tunes to the next frequency in the hop sequence as it enters the subsequent frame. Optionally, received signal strength indicator (RSSI) period 160 can be utilized by the receiver section to monitor the level of signal received on the channel during a period in which desired communication signaling does not occur, thereby providing an indication of the level of undesired noise on the particular channel.

Another aspect of many FHSS systems that is particularly advantageous is the ability to circumvent sources of interference at static frequencies by dynamically changing the frequency channels in the hop sequence, substituting a new frequency channel for a channel that is identified as having excessive noise. This process is commonly referred to as frequency adaptation, or dynamic channel allocation. Numerous methods of monitoring channel performance and determining when a channel should be removed from the hop sequence are known in the art.

Finally, many wireless systems also include time domain multiple access (TDMA) features so that multiple devices can communicate over a given wireless communications link. TDMA involves the division of a data frame into multiple time slots, whereby each device can communicate during its own time slot. One technique for implementing TDMA in a FHSS data frame is called a slow-hopping technique, and is illustrated in the graph of FIG. 2. This slow-hopping technique involves the transmission of a complete frame of data on each frequency in the hopping sequence. In the TDMA example of FIG. 2, each frame is subdivided into four bidirectional time slots that can be utilized by different communications devices. Each time slot 1 through 4 further includes a downlink period T and a corresponding uplink period R. For example, a wireless PBX telephone system can be implemented using the TDMA frame of FIG. 2 in which each of four handsets receives data from the base station during periods T1, T2, T3 and T4, respectively. Each of the four handsets then transmits data to the base station during periods R1, R2, R3 and R4, respectively. Therefore, multiple devices are capable of communicating over the single data frame operating on a single frequency in time.

However, slow-hopping systems such as that illustrated in FIG. 2 may inhibit the use of frequency adaptation techniques. This is because when a new handset is introduced into the system, or when an existing handset loses contact with the base, that handset must be resynchronized, the handset must "listen" to the base unit using the same hopping pattern, and thus the same frequencies, as the base unit to acquire synchronization. If the hopping pattern used by the base unit continually changes in accordance with a frequency adaptation technique, then a new handset attempting to wirelessly synchronize with the base unit cannot know the current hopping sequence and will therefore be unable to synchronize with the system. While in a single handset system the base unit can simply revert back to a default hopping sequence known to all handsets as soon as it loses contact with its handset, in a multiple access system the base unit may be actively communicating with other handsets using the optimized and perpetually adapting hop sequence, and may therefore be unable to promptly revert to a default sequence. If a multiple access system did switch each active communications link back to a predetermined non-adaptive hop sequence whenever the system is open synchronization of a new handset, then the handsets that are already synchronized and communicating cannot take advantage of adaptive interference avoidance techniques. Thus, conventional slow-hopping frame structures are not well-suited to TDMA FHSS systems that implement frequency adaptation techniques.

Another common TDMA frequency hopping scheme is one in which the carrier frequency hops, or changes, between each handset time slot. This technique can be referred to as a fast-hopping system, and is illustrated in FIG. 3. This type of fast-hopping technique is implemented in the WDCT cordless telephone protocol, which was adapted for the North American market and based, at least in part, upon the European DECT standard. Since the frequency of each time slot in a fast hopping system can be controlled independently, a fast hopping system can maintain a subset of time slots at fixed frequencies to facilitate synchronization of new communications deivces.

However, because such fast-hopping techniques require that the communication device transceivers change tuning frequencies between each time slot, rather than once per frame as in a slow-hopping system, a separate guard band is required between each time slot to allow the receiver and transmitter tuning frequencies to stabilize between frequency hops before any data transmission or reception occurs. As the number of time slots per data frame is increased, the proportion of each data frame consumed waiting for frequency stabilization during guard band periods increases accordingly. Thus, while the illustrated fast-hopping system allows for the use of independent hop sequences on each time slot, the data bandwidth—and accordingly the number of time slots that can be supported for a given frame length—is substantially decreased.

These and other desirable characteristics of the present invention will become apparent in view of the present specification, including claims, and drawings.

SUMMARY OF THE INVENTION

A frequency hopping time division multiple access frame structure is provided which implements dynamic channel allocation techniques while maintaining high proportions of data transmit time within each frame. The frame is a hybrid of fast hopping and slow hopping structures and can be employed in the context of a wireless communications system to which unsynchronized communications terminals must be introduced. The frame includes an uplink subframe and a downlink subframe, and each subframe is comprised of a first frequency hop and a second frequency hop. The first hop of each subframe employs a default, non-adaptive frequency hopping pattern and is comprised of at least one time slot. Because the hopping pattern of the first hops are predetermined, unsynchronized terminals can employ the same predetermined hopping patterns to synchronize with the communications system during a time slot in the first hop. The second hop of each subframe can utilize adaptive frequency hopping sequences, such that dynamic channel allocation techniques can be employed to avoid interference with the one or more time slots of which each second hop is comprised. Furthermore, because the first and second hops can include multiple time slots, and yet only a single guard band is required for all time slots in each hop, the effective data bandwidth of the frame is increased.

The hybrid data frame can be used in many applications. For example, in a cordless telephone system with multiple handsets and a single base unit, the first hop may be comprised of a single time slot hopping in a known, predetermined hop sequence for synchronization of newly-introduced handsets, or re-synchronization of handsets that have lost contact with the base unit. Once a handset has been synchronized, it can be assigned to one of a plurality of time slots within the second hop. The second hop can employ adaptive channel allocation techniques to maintain a high-quality, interference-free communications link between the handsets and the base. Once each time slot in the second hop has been assigned to a handset, the next synchronized handset can remain on the time slot in the first hop, and the first hop can switch to an adaptive hop sequence to avoid interference with communications on that time slot as well. If a time slot later becomes available in the second frequency hop, the handset communicating on the first hop can switch to the newly-available time slot in the second hop, such that the first hop resumes the predetermined non-adaptive hopping pattern and a new handset can synchronize with the system.

The hybrid frame structure can also be employed to implement other features that may be desirable for some applications. For example, true frequency diversity can be implemented within a single frame by causing a given communicating unit to transmit its data redundantly during both the first frequency hop, hopping according to one frequency hopping sequence, as well as the second hop, hopping according to a different frequency hopping sequence. Also, the time required for a handset to achieve synchronization can be reduced by including a larger number of time slots in the first hop following the default, predetermined hop sequence, while still providing one or more time slots in the second hop that employ adaptive hop sequence techniques for interference avoidance.

DETAILED DESCRIPTION OF THE DRAWINGS

Figure 1:
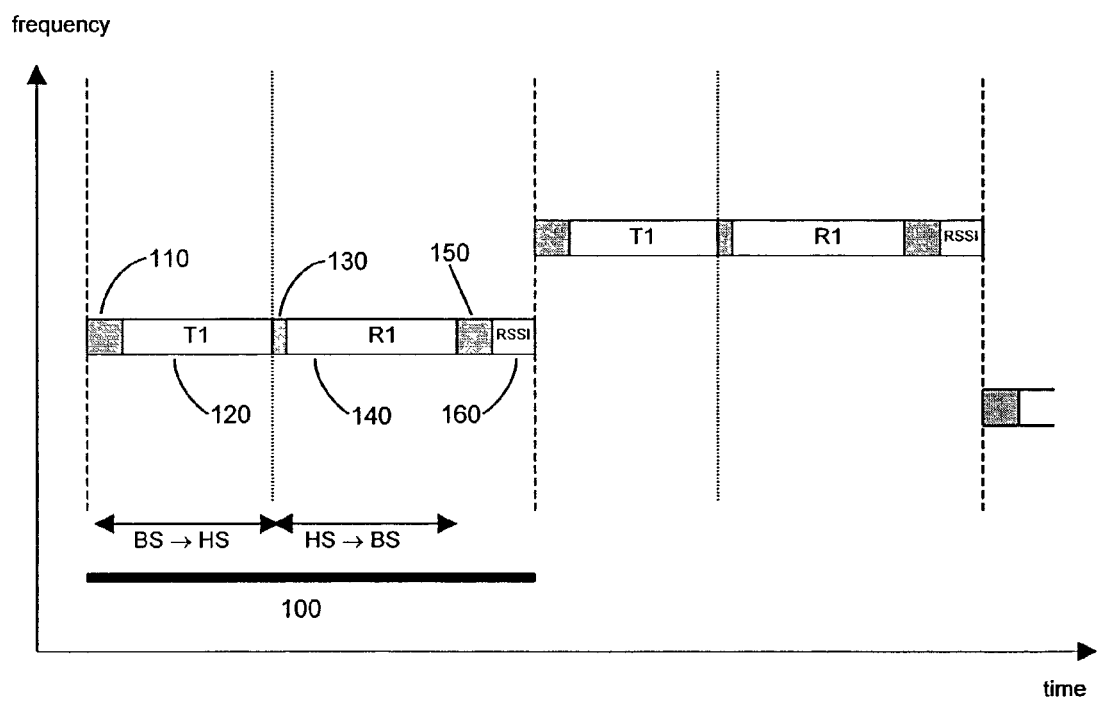
FIG. 1 is a graph of a prior art FHSS TDD frame structure.
Figure 2:
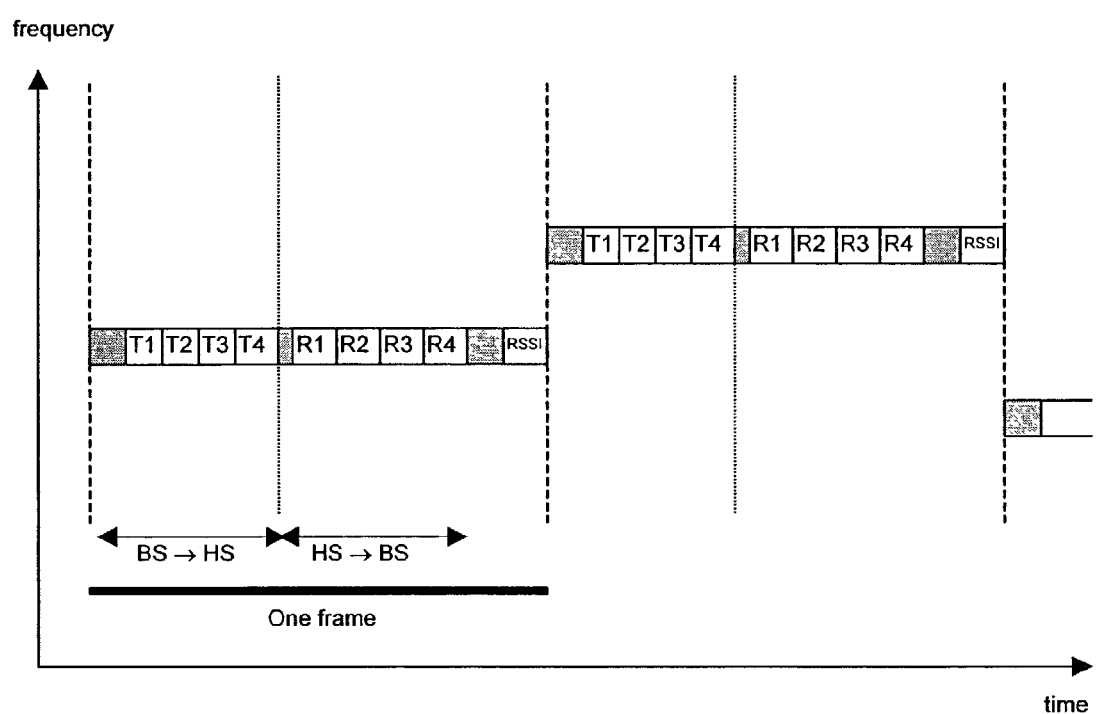
FIG. 2 is a graph of a prior art FHSS slow hopping TDMA frame structure.
Figure 3:
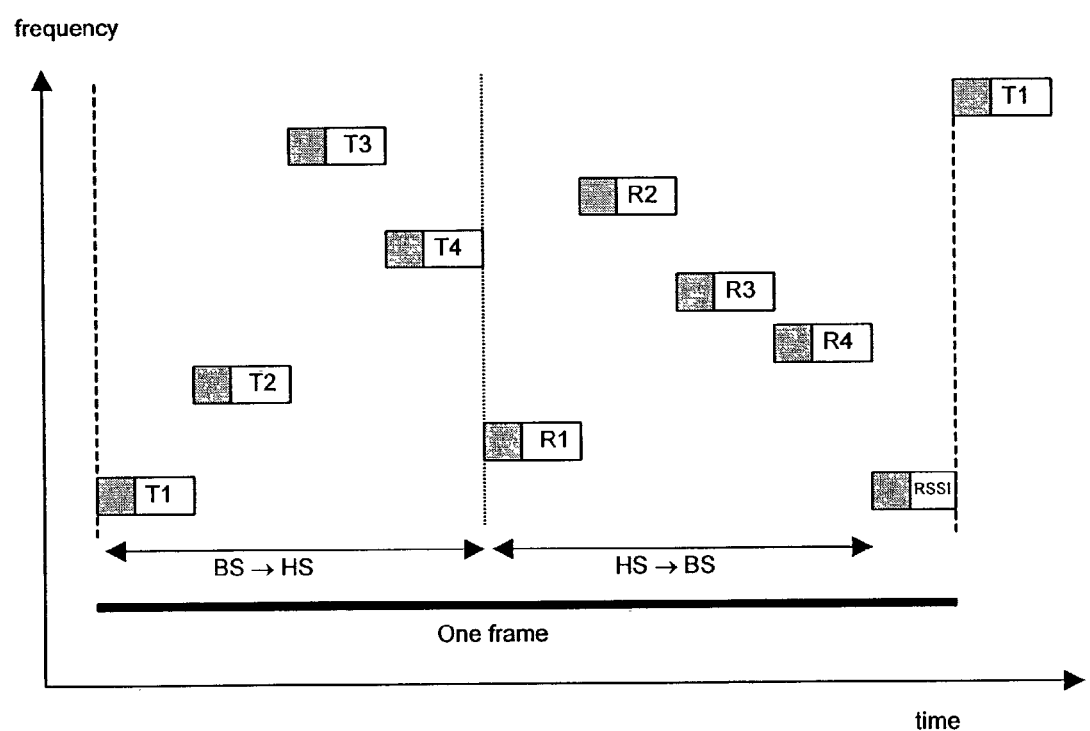
FIG. 3 is a graph of a prior art FHSS fast hopping TDMA frame structure.

While this invention is susceptible to embodiment in many different forms, there are shown in the drawings and will be described in detail herein several specific embodiments. The present disclosure is to be considered as an exemplification of the principle of the invention intended merely to explain and illustrate the invention, and is not intended to limit the invention in any way to embodiments illustrated.

Figure 4:
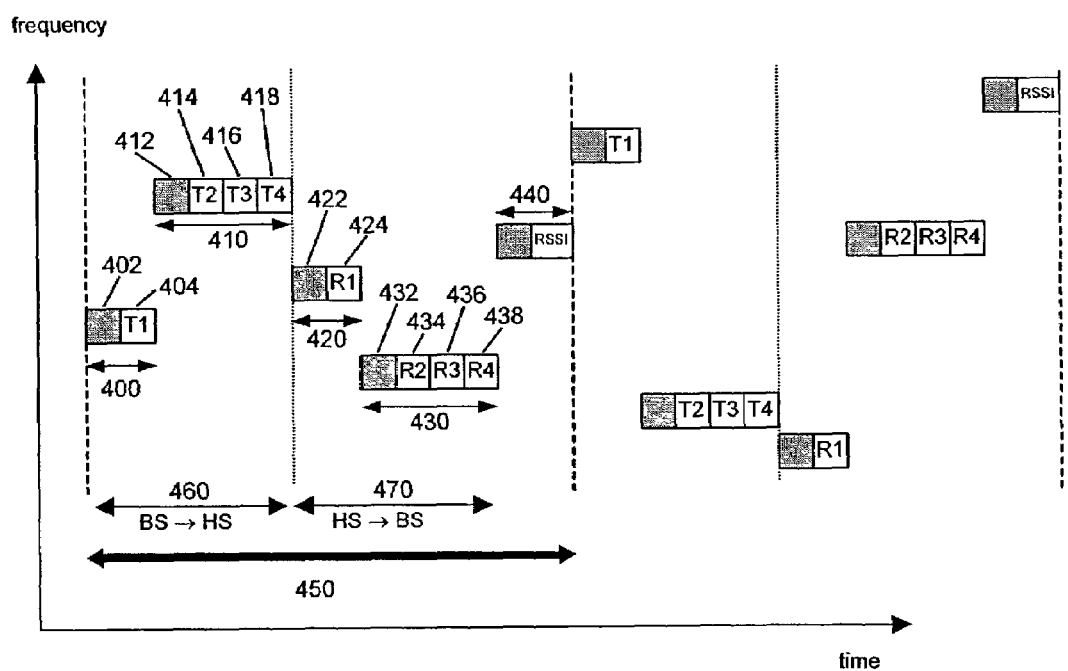
FIG. 4 is a graph of a FHSS TDMA frame structure according to an embodiment of the invention.

A hybrid frequency hopping TDMA data frame is presented. FIG. 4 illustrates a data frame according to a cordless telephone embodiment of the present invention in which a cordless telephone base unit is capable of communicating with up to four handsets. Data transmission to the handset from the base unit (the "downlink") occurs during downlink subframe 460. Data transmission from the handsets to the base unit (the "uplink") occurs during uplink subframe 470. Downlink subframe 460 and uplink subframe 470 are each comprised of at least two frequency hops, such that the carrier frequency on which the data is transmitted changes at least twice per subframe. An additional RSSI frequency hop, such as that during which RSSI time slot 440 occurs, may optionally be included in the data frame for noise monitoring of selected frequencies via RSSI measurements. Since neither the base, nor any handset transmits a signal during the RSSI hop, the power level measured (by either the base unit's receiver or a handset receiver) is indicative of the undesired noise (i.e., interference) level on the frequency channel being measured.

The data frame of FIG. 4 supports up to four bidirectional communications links via separate time slots. Each time slot has an uplink slot in the uplink subframe and a corresponding downlink slot in the downlink subframe. The subframes each include at least one fully adaptive frequency hop, and at least one frequency hop that normally implements a predetermined, non-adaptive hopping pattern. Specifically, downlink subframe 460 is comprised of non-adaptive frequency hop 400 and adaptive frequency hop 410. Non-adaptive hop 400 is divided into guard band 402 and a single downlink time slot 404, while adaptive hop 410 is divided into guard band 412 and three downlink time slots 414, 416 and 418. Uplink subframe 470 is similarly comprised of non-adaptive pattern frequency hop 420 and adaptive pattern frequency hop 430. Non-adaptive hop 420 includes guard band 422 and uplink time slot 424, while adaptive hop 430 is divided into guard band 432 and three uplink time slots, 434, 436 and 438. Each bidirectional communication link between the base unit and a handset includes associated pairs of uplink and downlink time slots. For example, non-adaptive downlink slot 404 and non-adaptive uplink slot 424 comprise one communications link between the base station and one handset. Adaptive communications links are formed by pairings of downlink slots 414, 416 and 418 with uplink slots 434, 436 and 438, respectively. Finally, the data frame illustrated in FIG. 4 further includes RSSI hop 440.

Figure 5:
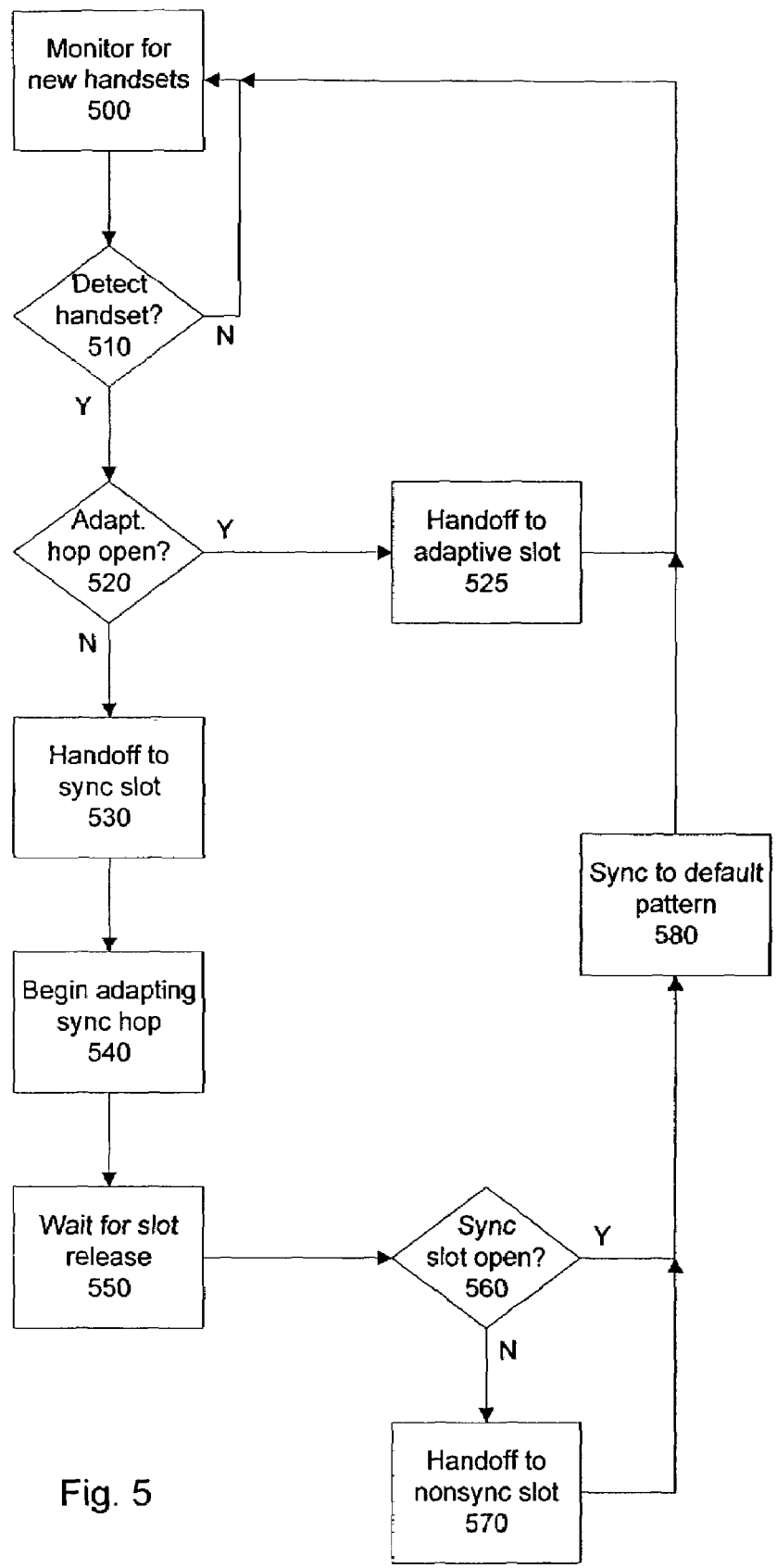
FIG. 5 is a flowchart describing the operation of a system utilizing the hybrid frame structure of FIG. 4.

FIG. 5 illustrates an example of the operation of a multiple handset cordless telephone system utilizing the hybrid frame structure of FIG. 4. The cordless telephone base monitors the radio channel for the initiation of communications by a new handset that does not have a time slot already assigned to it, step 500. Specifically, the base monitors uplink time slot 424, which is implementing a default fixed hopping pattern. All unassigned handsets are therefore pre-programmed to use time slot 424 and the default fixed hopping pattern for the synchronisation process.

When the base unit detects a request from a handset for a time slot assignment, step 510, the base unit determines whether one of the three time slots within the adaptive hops 410/430 is available to which the new handset can be assigned. If so, the base unit communicates the time slot assignment and the current hopping pattern of that time slot to the handset, step 525, via non-adaptive downlink time slot 404. Thereafter, communications between the base and the handset occur on the newly assigned time slot. Conventional adaptive frequency hopping techniques can then be implemented for adaptive hops 410 and 430, thus providing interference avoidance capabilities for the handset.

If none of the three time slots in adaptive hops 410/430 remain free for assignment to the new handset in step 520, then the handset is assigned to synchronisation slot 424, step 530. Once a handset is assigned to slot 424, an adaptive frequency hopping protocol is implemented such that the previously non-adaptive synchronization time slots 424 and 404, step 540, become adaptive so that the new handset can take advantage of interference avoidance techniques as well. As a result of synchronization time slots 404 and 424 being assigned to a specific handset and implementing adaptive hopping techniques, no open time slots remain implementing the default hopping pattern for synchronization of more new handsets. However, this does not substantially limit the system capabilities because this reassignment of hops 400 and 420 is not performed unless no further time slots are available for communication with additional handsets anyway.

Once all time slots of adaptive hops 410/430 have been assigned to handsets, the base unit awaits the release of any one time slot, step 550, which would open up capacity to once again allow for the synchronization of an additional handset. If synchronization time slot 424/404 becomes available in step 560, then the base unit returns the sync slots to the default fixed hopping patterns, step 580, and returns to step 500 to monitor for communications received from new handsets. If a time slot other than the synchronisation slot becomes available in step 560, then the handset currently occupying the synchronisation slot 404/424 is handed off to the now-available time slot in adaptive hops 410/430, step 570. Specifically, the base communicates the new time slot assignment and the current hopping pattern of that new time slot to the handset, and the handset and base simultaneously implement the new assignment. The synchronization slots 404 and 424 are then returned to their default hopping patterns for the detection of new handsets entering the system.

Figure 6:
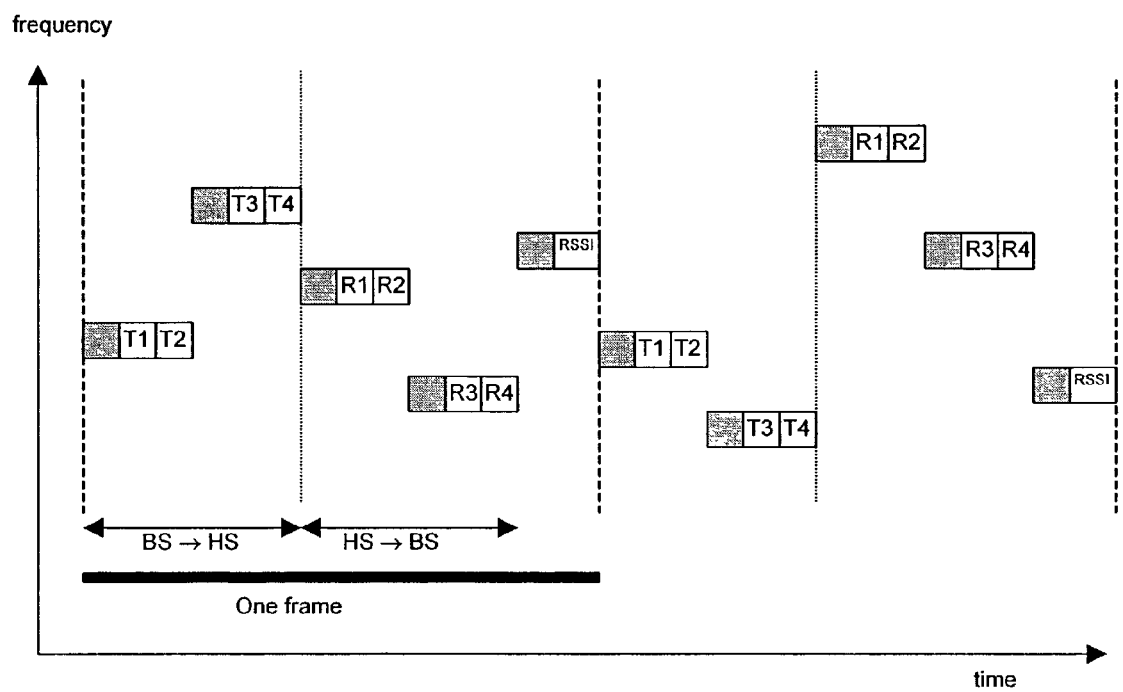
FIG. 6 is a graph of a FHSS TDMA frame structure according to another embodiment of the invention.
Figure 7:
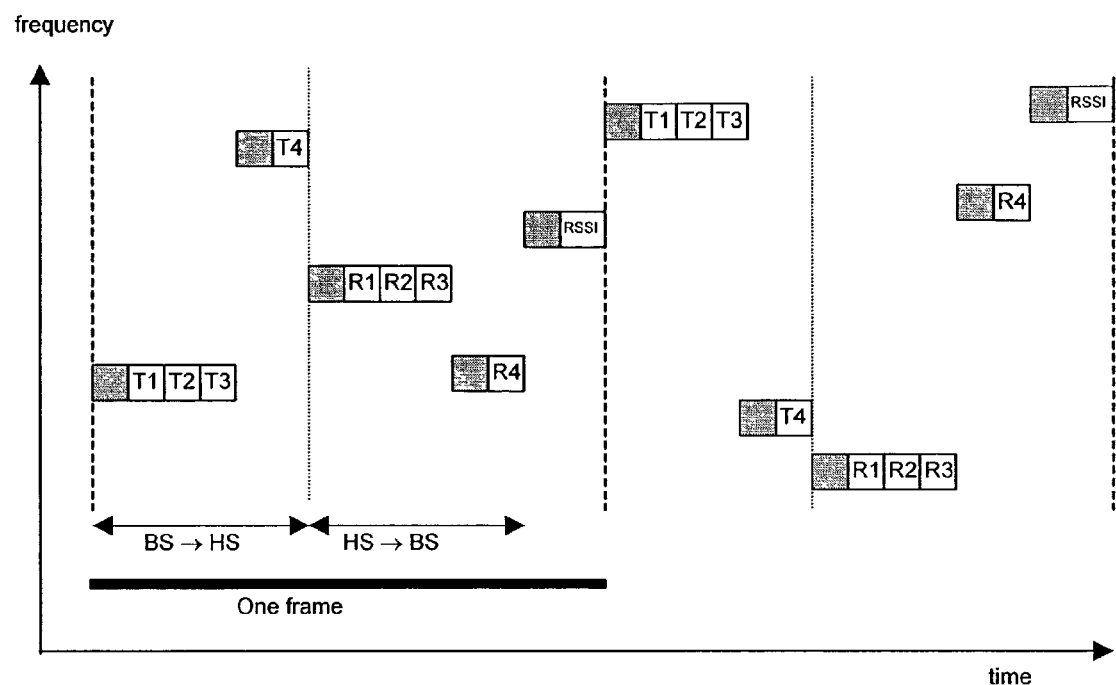
FIG. 7 is a graph of a FHSS TDMA frame structure according to yet another embodiment of the invention.

The frame depicted in FIG. 4 reflects just one embodiment of the hybrid frame format according to the present invention. In accordance with other embodiments, the boundary between the non-adaptive and the adaptive slots could be changed to achieve different performance characteristics while still providing convenient synchronization of new communicating units, adaptive frequency hopping interference avoidance, and excellent data bandwidth. For example, a system with four total time slots could alternatively be implemented using a data frame with a ratio of non-adaptive to adaptive time slots of 2:2, as is illustrated by the data frame of FIG. 6. A 2:2 ratio may be desirable for applications such as the implementation of true, single-frame frequency diversity in a two handset system, thereby providing particularly robust and interference-free communication links. The non-adaptive hop can be utilized for initial synchronization of the handsets as well as the primary transmission of data packets, while the time slots in the adaptive hop can be utilized for redundant data transmission within the same frame. Such an implementation provides not only true single frame frequency diversity, but also allows at least one of the diverse transmissions to implement dynamic interference avoidance techniques. Alternatively, a ratio of three non-adaptive slots to one adaptive slot could be implemented to reduce initial synchronisation times in a system in which that parameter is important, while still providing an adaptive frequency hopping interference avoidance feature. A data frame according to this embodiment is illustrated in FIG. 7.

Figure 8:
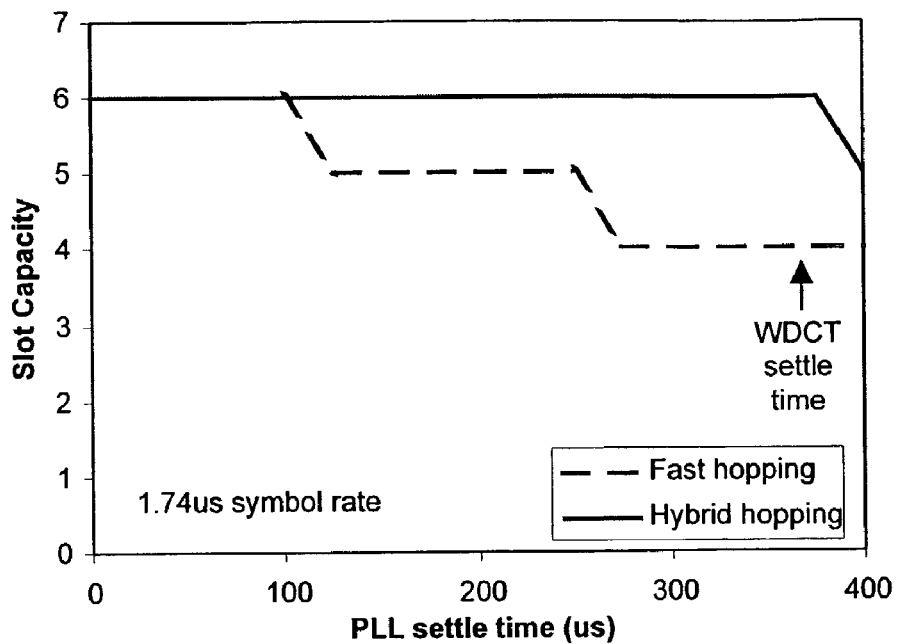
FIG. 8 is a graph comparing the slot capacities of hybrid and fast hopping systems versus PLL settle time for a 1.74 microsecond symbol rate.
Figure 9:
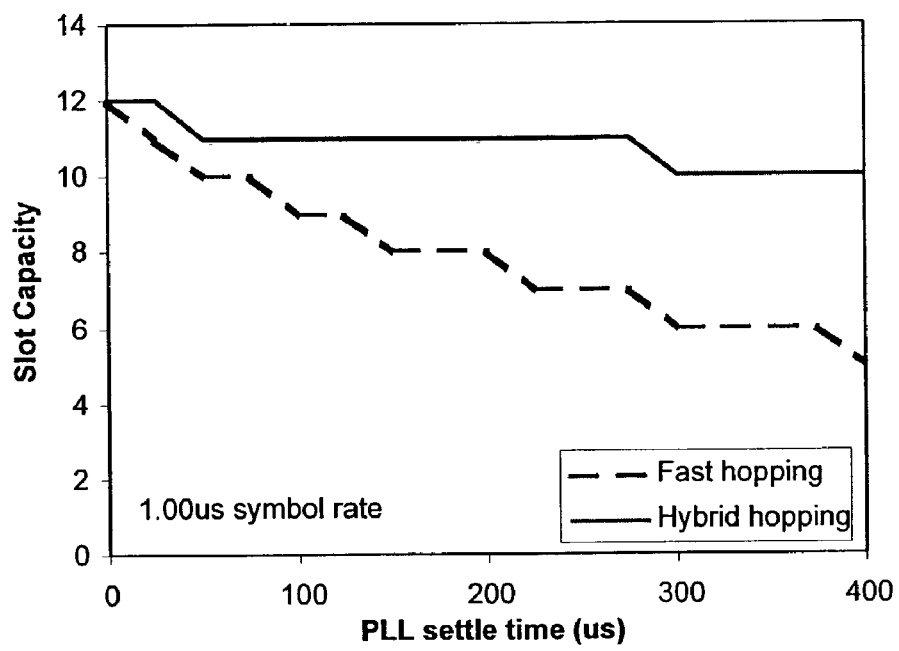
FIG. 9 is a graph comparing the slot capacities of hybrid and fast hopping systems versus PLL settle time for a 1.00 microsecond symbol rate.

One benefit of the hybrid frame structure can be demonstrated by calculating the number of time slots that can be implemented for a communication system with given frame lengths and data rates. For example, the WDCT cordless telephone standard defines a 10 ms frame length with a symbol rate of 1.74 µs. Given this frame length and symbol rate, FIG. 8 shows the number of time slots that can be implemented as a function of phase-locked loop settling time for both a fast-hopping protocol (such as WDCT) and the hybrid protocol presented herein. Because the hybrid frame structure requires fewer guard bands than a fast hopping frame, the hybrid frame structure allows for more time slots to be implemented—even while using a slower, lower-cost PLL in the receiver's frequency synthesizer tuning circuit. Using RF hardware designed to operate with the 367 µs guard band specified in WDCT, the hybrid frame structure allows for an increase in slot capacity from 4 to 6, while still allowing for dynamic channel allocation for interference avoidance. The slot capacity benefit of the hybrid frame structure becomes even more significant as the symbol rate increases. For example, the BLUETOOTH wireless standard employs a 10 ms frame length with a 1.00 µs symbol rate. FIG. 9 depicts the maximum slot capacity as a function of PLL settling time for fast hopping and hybrid systems given these parameters, whereby the increase in slot capacity achieved by the hybrid frame structure is even greater.

Figure 10:
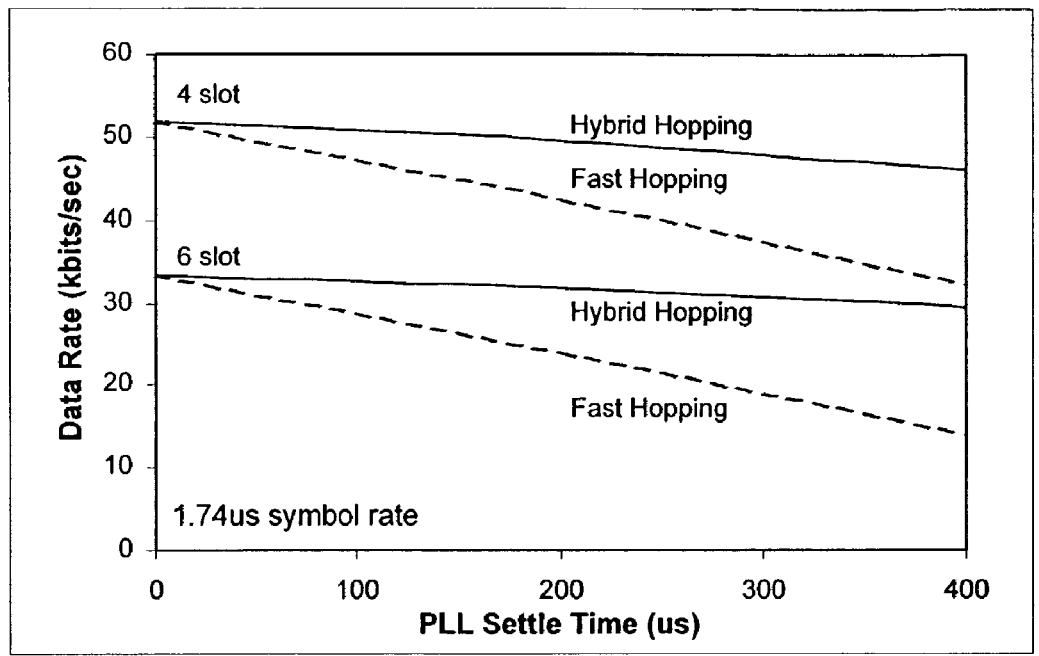
FIG. 10 is a graph comparing data transmission rate per slot versus PLL settle time for hybrid and fast hopping systems.

For bandwidth-driven applications such as data transmission services, the hybrid frame structure can be employed to provide increased data throughput for each slot given a desired number of communication links. FIG. 10 shows the data rate for each slot as a function of PLL settling time for both fast hopping and hybrid hopping systems, given a 10 ms frame length and a 1.74 µs symbol rate. As shown by the graph, the hybrid frame structure allows for the use of adaptive frequency hopping interference avoidance techniques while imposing a much smaller data rate penalty—even while using slower, less costly PLL frequency synthesizers.

The foregoing description and drawings merely explain and illustrate the invention and the invention is not limited thereto except insofar as the appended claims are so limited, inasmuch as those skilled in the art, having the present disclosure before them will be able to make modifications and variations therein without departing from the scope of the invention.

I claim:

1. A method for introducing a portable wireless communication terminal into a time division multiple access frequency hopping radio communications system comprised of a base unit that is capable of communicating with a plurality of portable wireless communication terminals via an uplink subframe and a downlink subframe, each subframe including a first frequency hop and a second frequency hop, where the first hops are each comprised of one or more time slots and each employ non-adaptive default frequency hopping patterns, and the second hops are each comprised of one or more time slots and each employ adaptive frequency hopping patterns, and where for each subframe at least one of the first hop and the second hop is comprised of a plurality of time slots, the method comprising the steps of:

transmitting by the portable terminal a request signal during a first time slot within the first frequency hop of the uplink subframe;

determining that the first time slot is the only slot in the first and second frequency hops of the uplink subframe available for use by the portable terminal;

converting the frequency hopping pattern of the first frequency hop of at least one subframe from the non-adaptive default pattern to an adaptive pattern;

communicating by the portable terminal during the first time slot;

determining that a second time slot in the uplink subframe has become available for use;

transitioning communications between the base unit and the portable terminal from the first time slot to the second time slot;

converting the frequency hopping patterns of the first frequency hops to the default nonadaptive pattern.

2. The method of claim 1, in which the first frequency hop of each subframe is comprised of a guard band and one time slot, and the second frequency hop of each subframe is comprised of a guard band and three time slots.

3. The method of claim 1, in which the frequency hopping patterns implemented by the first hops can become adaptive if all time slots within the second hop of either subframe are assigned to other portable terminals.

4. The method of claim 1, further comprising a third subframe during which received signal strength interference measurements are made.

5. The method of claim 1, in which data is transmitted redundantly within at least one of the subframes by transmitting a data field a first time during at least one time slot in the first hop and a second time during at least one time slot in the second hop of the same subframe, thereby implementing frequency diversity.

6. The method of claim 1, in which for at least one subframe, the first frequency hop and the second frequency hop are each comprised of a plurality of time slots.

7. The method of claim 1, in which the first hop of at least the downlink subframe is comprised of a plurality of time slots, whereby the data frame can be used by a communications system to reduce the time required for an unsynchronized communicating unit to synchronize with the communications system relative to the time tat would be required if the first hop of the downlink subframe was comprised of a single time slot.

* * * * *